(12) United States Patent
Parthasarathy et al.

(10) Patent No.: US 11,727,618 B1
(45) Date of Patent: Aug. 15, 2023

(54) ARTIFICIAL INTELLIGENCE-BASED SYSTEM AND METHOD FOR GENERATING ANIMATED VIDEOS FROM AN AUDIO SEGMENT

(71) Applicant: xNeurals Inc., Los Altos, CA (US)

(72) Inventors: Yathish Parthasarathy, Los Altos, CA (US); Vishal Yathish, Los Altos, CA (US)

(73) Assignee: xNeurals Inc., Los Altos, CA (US)

( * ) Notice: Subject to any disclaimer, the term of this patent is extended or adjusted under 35 U.S.C. 154(b) by 0 days.

(21) Appl. No.: 17/822,291

(22) Filed: Aug. 25, 2022

(51) Int. Cl.
*G06T 13/80* (2011.01)
*G06F 40/40* (2020.01)

(52) U.S. Cl.
CPC .............. *G06T 13/80* (2013.01); *G06F 40/40* (2020.01)

(58) Field of Classification Search
None
See application file for complete search history.

(56) References Cited

U.S. PATENT DOCUMENTS

| 2021/0020149 | A1* | 1/2021 | Li | G11B 27/28 |
| 2021/0064925 | A1* | 3/2021 | Shih | G06T 9/002 |
| 2021/0224319 | A1* | 7/2021 | Ingel | G06F 16/686 |

OTHER PUBLICATIONS

Karras et al. "Audio-driven facial animation by joint end-to-end learning of pose and emotion," Aug. 2017; ACM Trans. Graph. 36, 4, Article 94 (Aug. 2017), 12 pages, https://doi.org/10.1145/3072959.3073658 (Year: 2017).*

\* cited by examiner

*Primary Examiner* — Peter Hoang
(74) *Attorney, Agent, or Firm* — Jason C. Cameron

(57) ABSTRACT

An AI-based system and method for generating animated videos from an audio segment is disclosed. The method includes receiving a first audio segment including a description of one or more characters and a scenery for the one or more characters, and a second audio segment including a character speech to be spoken by each of the one or more characters by using one or more expressions. The method includes generating a character image for each of the one or more characters, extracting one or more character sounds and one or more character phrases from the second audio segment, and obtaining one or more prestored video clips from an external database. Furthermore, the method includes generating one or more character video clips and a final character video, such that the final character video may be outputted on user interface screen of one or more electronic devices.

20 Claims, 9 Drawing Sheets

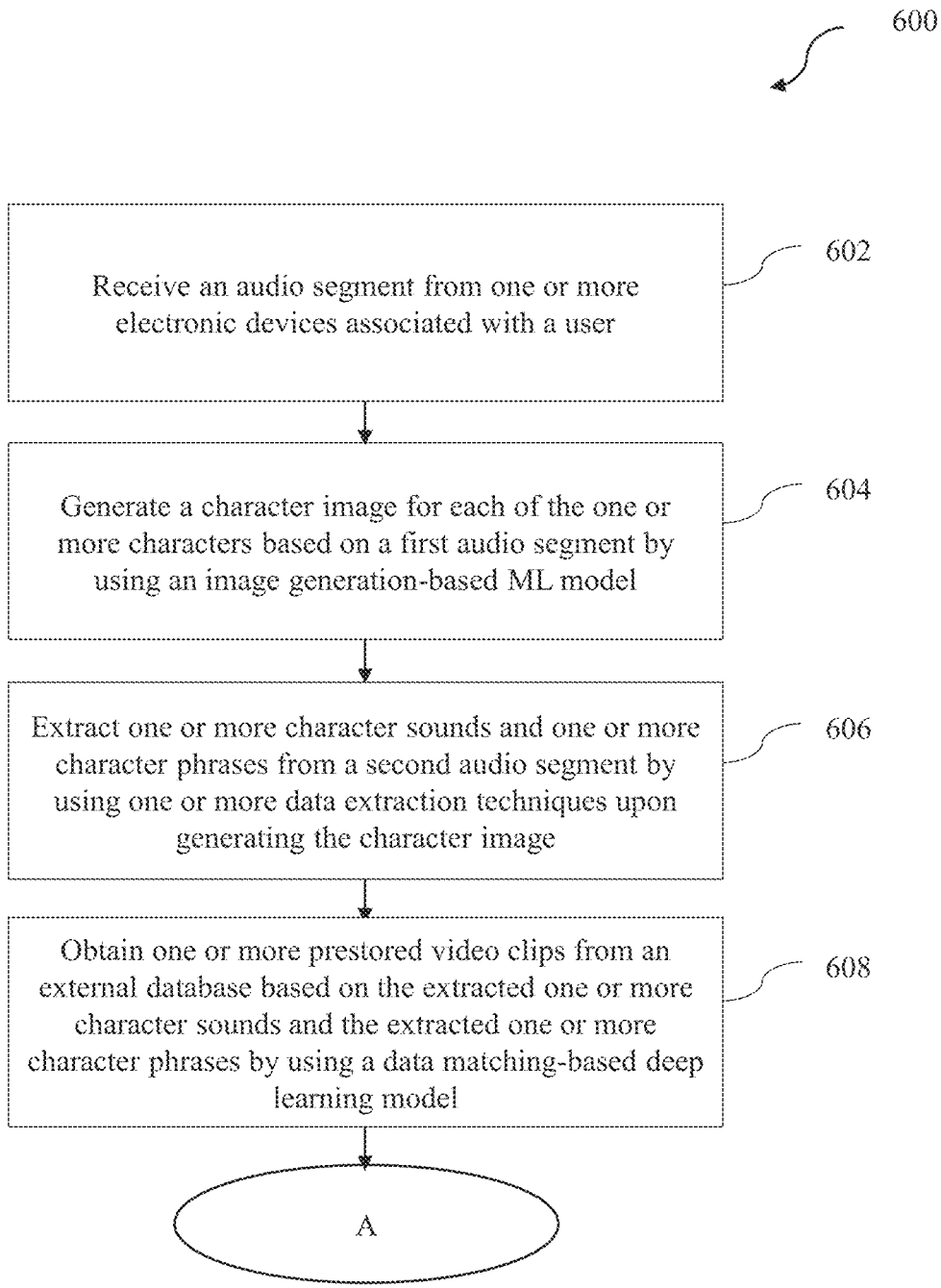
FIG. 6 (contd)

ARTIFICIAL INTELLIGENCE-BASED SYSTEM AND METHOD FOR GENERATING ANIMATED VIDEOS FROM AN AUDIO SEGMENT

FIELD OF INVENTION

Embodiments of the present disclosure relate to a video generation system and more particularly relates to an AI-based system and method for generating animated videos from an audio segment.

BACKGROUND

Traditionally animated videos, such as photorealistic animated video, are manually produced by graphic designers. However, the process of creating the photorealistic animated video is extremely labour intensive and requires graphic designers to sketch out ever movement and expression of a character. Traditionally, it requires weeks or even months to complete the photorealistic animated video. Thus, traditional method requires a lot of efforts and time to create the animated videos. Further, when the animated video is complete, the graphic designers cannot make modifications to the character's designs (not modular) without making significant efforts. Furthermore, the traditional method requires a big team of designers for creating the animated videos. Thus, the traditional method of creating the animated videos is very costly.

Hence, there is a need for an improved AI-based system and method for generating animated videos from an audio segment, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, an Artificial Intelligence (AI)-based computing system for generating animated videos from an audio segment is disclosed. The AI-based computing system includes one or more hardware processors and a memory coupled to the one or more hardware processors. The memory includes a plurality of modules in the form of programmable instructions executable by the one or more hardware processors. The plurality of modules include a data receiver module configured to receive an audio segment from one or more electronic devices associated with a user. The audio segment includes a first audio segment and a second audio segment separated by using a separation word. The first audio segment includes a description of one or more characters and a scenery for the one or more characters. The second audio segment includes a character speech to be spoken by each of the one or more characters by using one or more expressions. The plurality of modules also include a character generation module configured to generate a character image for each of the one or more characters based on the first audio segment by using an image generation-based Machine Learning (ML) model. The plurality of modules includes a data extraction module configured to extract at least one of: one or more character sounds and one or more character phrases from the second audio segment by using one or more data extraction techniques upon generating the character image. Further, the plurality of modules a data obtaining module configured to obtain one or more prestored video clips from an external database based on at least one of: the extracted one or more character sounds and the extracted one or more character phrases by using a data matching-based deep learning model. The one or more prestored video clips correspond to video clips of one or more actors speaking the at least one of: the extracted one or more character sounds and the extracted one or more character phrases along with the one or more facial expressions. The plurality of modules also include a video generation module configured to generate one or more character video clips by transposing each of the one or more prestored video clips onto the generated character image by using a video transposing-based AI model. The one or more character video clips are video clips of the one or more characters making the one or more expressions and one or more movements corresponding to each of the at least one of: the extracted one or more character sounds and the extracted one or more character phrases. Furthermore, the video generation module is configured generate a cohesive character video by performing one or more smoothing operations on the generated one or more character video clips by using a video-stitching-based deep learning model. The video generation module is configured to generate a final character video by transposing the second audio segment on the generated cohesive character video by using the video transposing-based AI model. The final character video is a video of the one or more characters speaking the character speech with the one or more expressions. The plurality of modules also include a data output module configured to output the generated final character video on user interface screen of the one or more electronic devices associated with the user.

In accordance with another embodiment of the present disclosure, an AI-based method for generating animated videos from an audio segment is disclosed. The AI-based method includes receiving an audio segment from one or more electronic devices associated with a user. The audio segment includes a first audio segment and a second audio segment separated by using a separation word. The first audio segment includes a description of one or more characters and a scenery for the one or more characters. The second audio segment includes a character speech to be spoken by each of the one or more characters by using one or more expressions. The AI-based method further includes generating a character image for each of the one or more characters based on the first audio segment by using an image generation-based. ML model. Further, the AI-based method includes extracting at least one of: one or more character sounds and one or more character phrases from the second audio segment by using one or more data extraction techniques upon generating the character image. Also, the AI-based method includes obtaining one or more prestored video clips from an external database based on at least one of: the extracted one or more character sounds and the extracted one or more character phrases by using a data matching-based deep learning model. The one or more prestored video clips correspond to video clips of one or more actors speaking the at least one of: the extracted one or more character sounds and the extracted one or more character phrases along with the one or more facial expressions. Furthermore, the AI-based method includes generating one or more character video clips by transposing each of the one or more prestored video clips onto the generated character image by using a video transposing-based AI model. The one or more character video clips are video clips of the one or more characters making the one or more expressions and one or more movements corresponding to each of the at least one of: the extracted one or more character sounds and the extracted one or more character phrases. The AI-based method also includes generating a cohesive character video by performing one or more smoothing operations on the generated one or more character video clips by using a video-stitching-based deep learning model. Further, the AI-based method includes generating a final character video by transposing the second audio segment on the generated cohesive character video by using the video transposing-based AI model. The final character video is a video of the one or more characters speaking the character speech with the one or more expressions. The AI-based method includes outputting the generated final character video on user interface screen of the one or more electronic devices associated with the user.

Embodiment of the present disclosure also provide a non-transitory computer-readable storage medium having instructions stored therein that, when executed by a hardware processor, cause the processor to perform method steps as described above.

To further clarify the advantages and features of the present disclosure, a more particular description of the disclosure will follow by reference to specific embodiments thereof which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
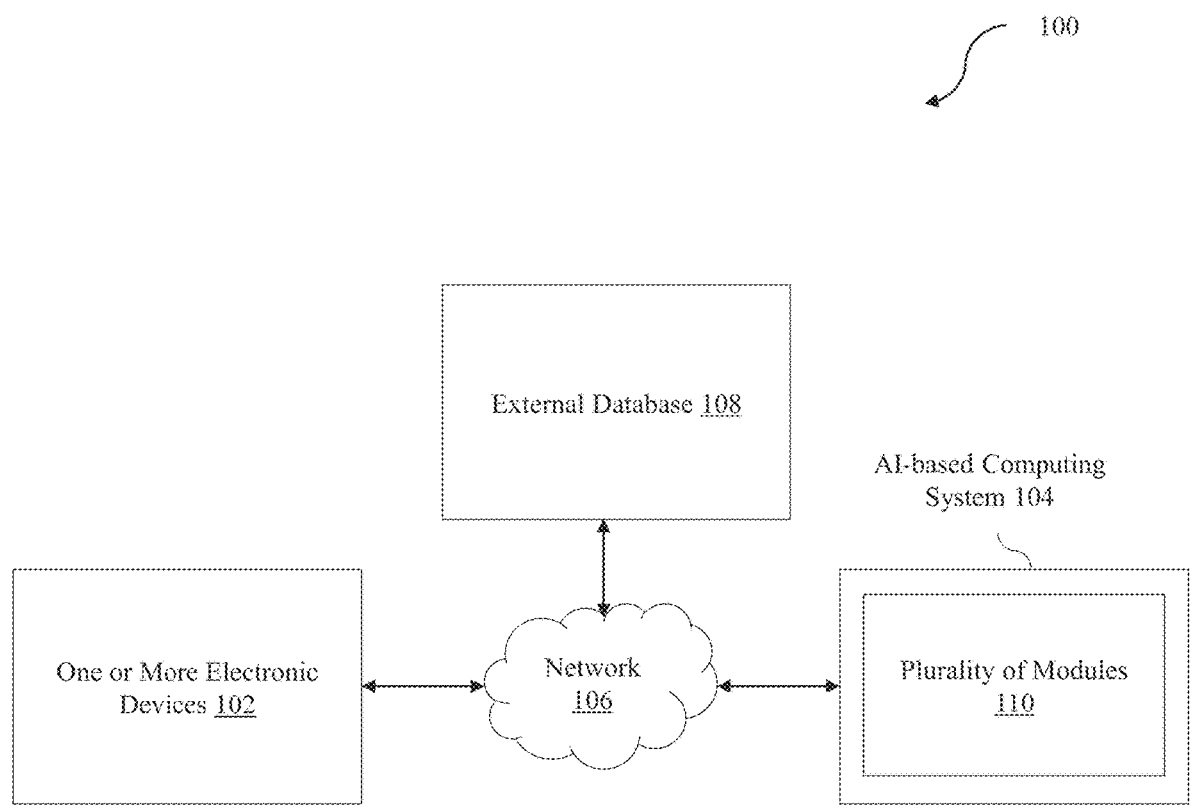
FIG. 1 is a block diagram illustrating an exemplary computing environment for generating animated videos from an audio segment, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIGS. 1 through FIG. 6, where similar reference characters denote corresponding features consistently throughout the figures, there are shown preferred embodiments and these embodiments are described in the context of the following exemplary system and/or method.

FIG. 1 is a block diagram illustrating an exemplary computing environment 100 for generating animated videos from an audio segment, in accordance with an embodiment of the present disclosure. According to FIG. 1, the computing environment 100 includes one or more electronic devices 102 associated with a user communicatively coupled to an Artificial Intelligence (AI)-based computing system 104 via a network 106. The one or more electronic devices 102 are used by the user to provide an audio segment to the AI-based computing system 104. The one or more electronic devices 102 are also used by the user to receive a final character video. In an exemplary embodiment of the present disclosure, the one or more electronic devices 102 may include a laptop computer, desktop computer, tablet computer, smartphone, wearable device, smart watch, and the like. In an embodiment of the present disclosure, the AI-based computing system 104 may be hosted on a central server, such as cloud server or a remote server. In an embodiment of the present disclosure, the AI-based computing system 104 may correspond to speech to video Application Programming Interface (API). Further, the network 106 may be internet or any other wireless network.

Further, the computing environment 100 includes an external database 108 communicatively coupled to the AI-based computing system 104 via the network 106. In an embodiment of the present disclosure, the external database 108 stores a set of prestored video clips. The set of prestored video clips correspond to video clips of one or more actors speaking a set of character sounds and a set of character phrases along with a set of facial expressions. For example, the set of character sounds may be laughing sound, crying sound, and the like. For example, the set of character phrases may be 'Hello, my name is XYZ'. In an exemplary embodiment of the present disclosure, the set of facial expressions include happiness, sadness, anger, surprise, disgust, fear, confusion, excitement, desire, contempt and the like.

Furthermore, the one or more electronic devices 102 include a local browser, a mobile application or a combination thereof. Further, the user may use a web application via the local browser, the mobile application or a combination thereof to communicate with the AI-based computing system 104. In an exemplary embodiment of the present disclosure, the mobile application may be compatible with any mobile operating system, such as android, iOS, and the like. In an embodiment of the present disclosure, the AI-based computing system 104 includes a plurality of modules 110. Details on the plurality of modules 110 have been elaborated in subsequent paragraphs of the present description with reference to FIG. 2.

In an embodiment of the present disclosure, the AI-based computing system 104 is configured to receive the audio segment from the one or more electronic devices 102 associated with the user. The audio segment include a first audio segment and a second audio segment separated by using a separation word. In an embodiment of the present disclosure, the first audio segment includes a description of one or more characters and a scenery for the one or more characters. Further, the second audio segment includes a character speech to be spoken by each of the one or more characters by using one or more expressions. The AI-based computing system 104 generates a character image for each of the one or more characters based on the first audio segment by using an image generation-based Machine Learning (ML) model. The AI-based computing system 104 extracts one or more character sounds, one or more character phrases or a combination thereof from the second audio segment by using one or more data extraction techniques upon generating the character image. Furthermore, the AI-based computing system 104 obtains one or more prestored video clips from an external database 108 based on the one or more character sounds, the one or more character phrases or a combination thereof by using a data matching-based deep learning model. The AI-based computing system 104 generates one or more character video clips by transposing each of the one or more prestored video clips onto the generated character image by using a video transposing-based AI model. The AI-based computing system 104 generates a cohesive character video by performing one or more smoothing operations on the generated one or more character video clips by using a video-stitching-based deep learning model. Further, the AI-based computing system 104 generates the final character video by transposing the second audio segment on the generated cohesive character video by using the video transposing-based AI model. The AI-based computing system 104 outputs the generated final character video on user interface screen of the one or more electronic devices 102 associated with the user.

Figure 2:
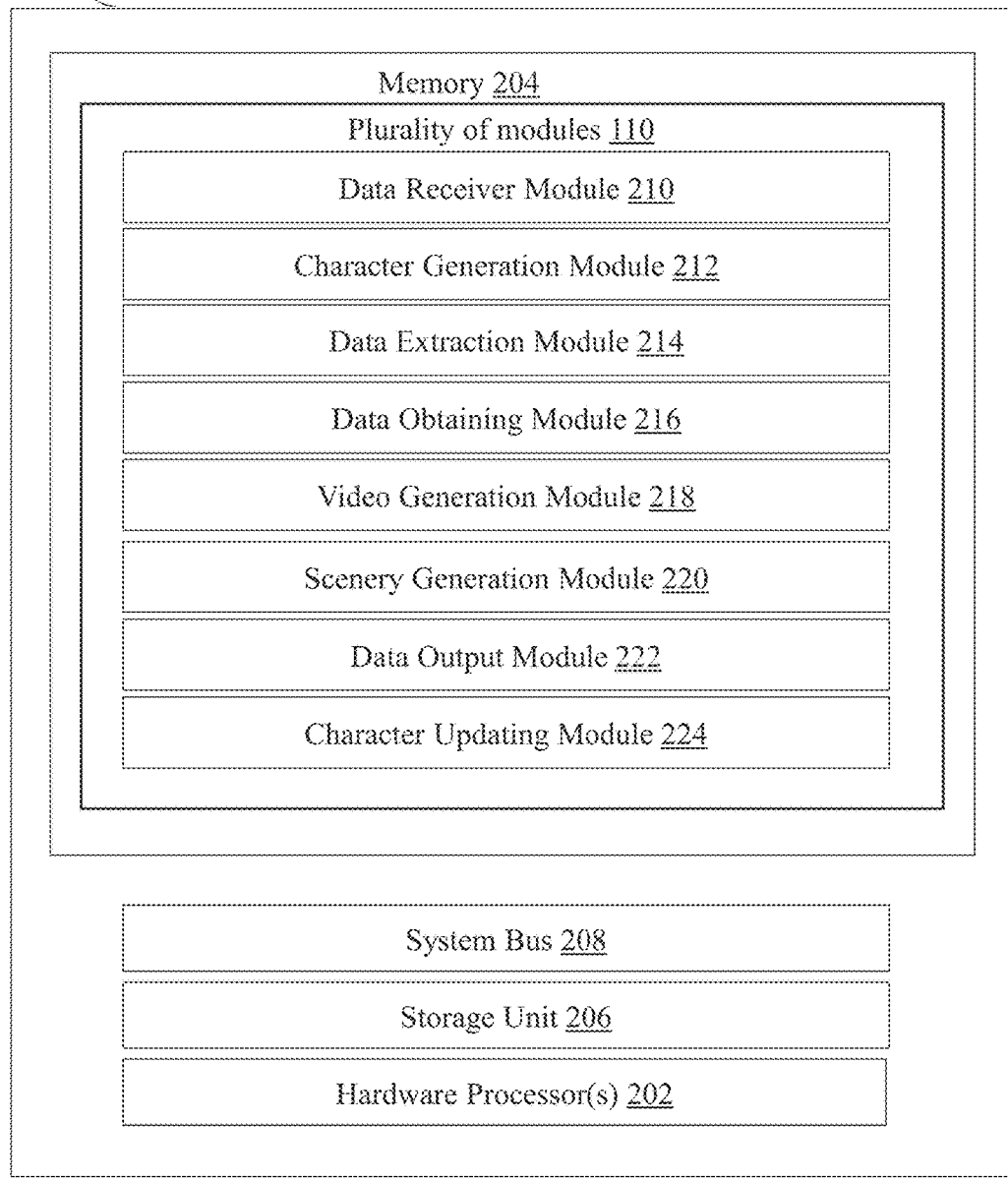
FIG. 2 is a block diagram illustrating an exemplary AI-based computing system for generating animated videos from the audio segment, in accordance with an embodiment of the present disclosure.

FIG. 2 is a block diagram illustrating an exemplary AI-based computing system 104 for generating animated videos from the audio segment, in accordance with an embodiment of the present disclosure. Further, the AI-based computing system 104 includes one or more hardware processors 202, a memory 204 and a storage unit 206. The one or more hardware processors 202, the memory 204 and the storage unit 206 are communicatively coupled through a system bus 208 or any similar mechanism. The memory 204 comprises the plurality of modules 110 in the form of programmable instructions executable by the one or more hardware processors 202. Further, the plurality of modules 110 includes a data receiver module 210, a character generation module 212, a data extraction module 214, a data obtaining module 216, a video generation module 218, a scenery generation module 220, a data output module 222, and a character updating module 224.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more hardware processors 202, such as being a computer-readable storage medium. The one or more hardware processors 202 may execute machine-readable instructions and/or source code stored in the memory 204, A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes the plurality of modules 110 stored in the form of machine-readable instructions on any of the above-mentioned storage media and may be in communication with and executed by the one or more hardware processors 202.

In an embodiment of the present disclosure, the storage unit 206 may be a cloud storage. The storage unit 206 may store the audio segment, the character image, the one or more character sounds, the one or more character phrases, the one or more prestored video clips, the one or more character video dips, the cohesive character video, the final character video, one or more audio inputs, and the like.

The data receiver module 210 is configured to receive the audio segment from the one or more electronic devices 102 associated with the user. In an embodiment of the present disclosure, the audio segment includes a first audio segment and a second audio segment separated by using a separation word. For example, the separation word used to separate the first audio segment and the second audio segment is 'break'. In an embodiment of the present disclosure, the first audio segment includes a description of the one or more characters and a scenery for the one or more characters. In an embodiment of the present disclosure, the description of the one or more characters include eye, hair, skin color, one or more distinguishing facial features, type of the one or more characters, one or more major clothing items of the one or more characters, and the like. For example, one or more distinguishing facial features may include beard, mole, round cheeks, dimpled chin, and the like. In an exemplary embodiment of the present disclosure, the type of the one or more characters may be 2-Dimensional (D) character, 3-D character, human realistic character, animal character, plant, human character, photo-realistic character, anime character, and the like. In an exemplary embodiment of the present disclosure, the scenery may be mountains, dessert, beach, sunset, and the like. Further, the second audio segment includes a character speech to be spoken by each of the one or more characters by using one or more expressions. The character speech may include one or more character phrases and one or more character sounds. For example, the one or more character sounds may be laughing sound, crying sound, and the like. For example, the one or more character phrases may be 'Hello, my name is XYZ'. In an exemplary embodiment of the present disclosure, the one or more facial expressions include happiness, sadness, anger, surprise, disgust, fear, confusion, excitement, desire, contempt, and the like. For example, the one or more electronic devices 102 may include a laptop computer, desktop computer, tablet computer, smartphone, wearable device, smart watch, and the like.

The character generation module 212 is configured to generate the character image for each of the one or more characters based on the first audio segment by using the image generation-based ML model. In an embodiment of the present disclosure, the image generation-based ML model may be an advanced neural network model. In generating the character image for each of the one or more characters based on the first audio segment by using the image generation-based ML model, the character generation module 212 is configured to convert the first audio segment into a speech text based on a type of language used in the first audio segment by using a Natural Language Processing (NLP) technique.

Further, the character generation module 212 generates the character image for each of the one or more characters based on the speech text by using the image generation-based ML model. The image generation-based ML model may be an advanced image generation model, such as neural network model. In an embodiment of the present disclosure, the character image of each of the one or more characters are 2-D character, 3-D character, human realistic character, animal character, plant, human character, photo-realistic character, anime character, or a combination thereof.

The data extraction module 214 is configured to extract one or more character sounds, one or more character phrases or a combination thereof from the second audio segment by using one or more data extraction techniques upon generating the character image.

The data obtaining module 216 is configured to obtain the one or more prestored video clips from the external database 108 based on the extracted one or more character sounds, the extracted one or more character phrases or a combination thereof by using a data matching-based deep learning model. In an embodiment of the present disclosure, the external database 108 corresponds to a Differentiable Geometry Algorithm Library (DGAL). Further, the one or more prestored video clips correspond to video clips of one or more actors speaking the extracted one or more character sounds, the extracted one or more character phrases or a combination thereof along with the one or more facial expressions. In obtaining the one or more prestored video clips from the external database 108 based on the extracted one or more character sounds, the extracted one or more character phrases or a combination thereof by using the data matching-based deep learning model, the data obtaining module 216 is configured to compare the extracted one or more character sounds, the extracted one or more character phrases or a combination thereof with the set of prestored video clips stored in the external database 108 by using the data matching-based deep learning model. In an embodiment of the present disclosure, an NLP-based search query using open source models is used to extract meaning from the input strings. Further, an ANSI-SQL-based database query is used to retrieve the stored video clips. In an embodiment of the present disclosure, the set of prestored video clips correspond to video clips of the one or more actors speaking the set of character sounds and the set of character phrases along with the set of facial expressions. Further, the data obtaining module 216 obtains the one or more prestored video clips from the external database 108 similar to the extracted one or more character sounds, the extracted one or more character phrases or a combination thereof based on result of comparison.

The video generation module 218 is configured to generate the one or more character video clips by transposing each of the one or more prestored video clips onto the generated character image by using the video transposing-based AI model. In an embodiment of the present disclosure, the video transposing-based AI model may be an advanced neural network model. In an embodiment of the present disclosure, the audio segment is transposed onto the generated cohesive character video using the public utility to synchronize and merge the audio with the generated output. The one or more character video clips are video clips of the one or more characters making the one or more expressions and one or more movements corresponding to each of the extracted one or more character sounds, the extracted one or more character phrases or a combination thereof.

Further, the video generation module 218 is configured to generate the cohesive character video by performing the one or more smoothing operations on the generated one or more character video clips by using the video-stitching-based deep learning model. In generating the cohesive character video by performing the one or more smoothing operations on the generated one or more character video clips by using the video-stitching-based deep learning model, the video generation module 218 is configured to generate a cohesive video by merging the generated one or more character video clips by using the video-stitching-based deep learning model. The video generation module 218 removes one or more sudden shifts from the generated cohesive video by performing the one or more smoothing operations. In an embodiment of the present disclosure, a custom Graph Neural Network (GNN) is used to map the facial features/landmarks as nodes on a graph, with nodes placed at the center & corners of the eyes, nose, edges of the mouth, etc. When the cohesive video is run through the GNN, the custom GNN aligns the facial landmarks at the end of each clip and the start of the next clip, ensuring a smooth transition between facial expressions/movements. Furthermore, the video generation module 218 removes one or more breaks from the generated cohesive video by performing the one or more smoothing operations upon removing the one or more sudden shifts.

Furthermore, the video generation module 218 generates a final character video by transposing the second audio segment on the generated cohesive character video by using the video transposing-based AI model. In an embodiment of the present disclosure, the final character video is a video of the one or more characters speaking the character speech with the one or more expressions.

In an embodiment of the present disclosure, the scenery generation module 220 is configured to generate a scenery image for the scenery based on the speech text by using the image generation-based ML model. Further, the scenery generation module 220 generates a final character image by transposing the generated scenery image onto the generated character image by using the video transposing-based AI model. In an embodiment of the present disclosure, each of the one or more prestored video clips are transposed onto the generated final character image by using the video transposing-based AI model to generate the one or more character video clips. To generate the scenery image, a custom-trained Contrastive Language-Image Pretraining (CLIP)-Diffusion Model and Neural Style Transfer is used to achieve a desired artistic effect. The diffusion model works by taking an input of a training image and adding Gaussian noise till the point where the new image is independent of the original image. The model is trained by reversing this process (denoising), thus learning to generate images similar to the original image, guided by text prompts—the processed descriptions of the scenery taken from the audio segment. Further, the scenery image is transposed onto the generated character image. The scenery image corresponds to pre-existing styles (samples), which specify color and artistic style, using open-source neural style transfer techniques. In an embodiment of the present disclosure, the completed character video (not having a background) is transposed onto the scenery image by using a standard image mapping algorithm via the public utility.

The data output module 222 is configured to output the generated final character video on user interface screen of the one or more electronic devices 102 associated with the user.

The character updating module 224 is configured to receive one or more audio inputs to update the character, the scenery, the speech, or a combination thereof in the final character video. Further, the character updating module 224 determines a type of the received one or more audio inputs by using the NLP technique. In an embodiment of the present disclosure, the type of the received one or more audio inputs include the character, the scenery, the speech, or a combination thereof. Further, the character updating module 224 updates the final character video based on the determined type of the received one or more audio inputs by using AI and ML techniques.

Figure 3:
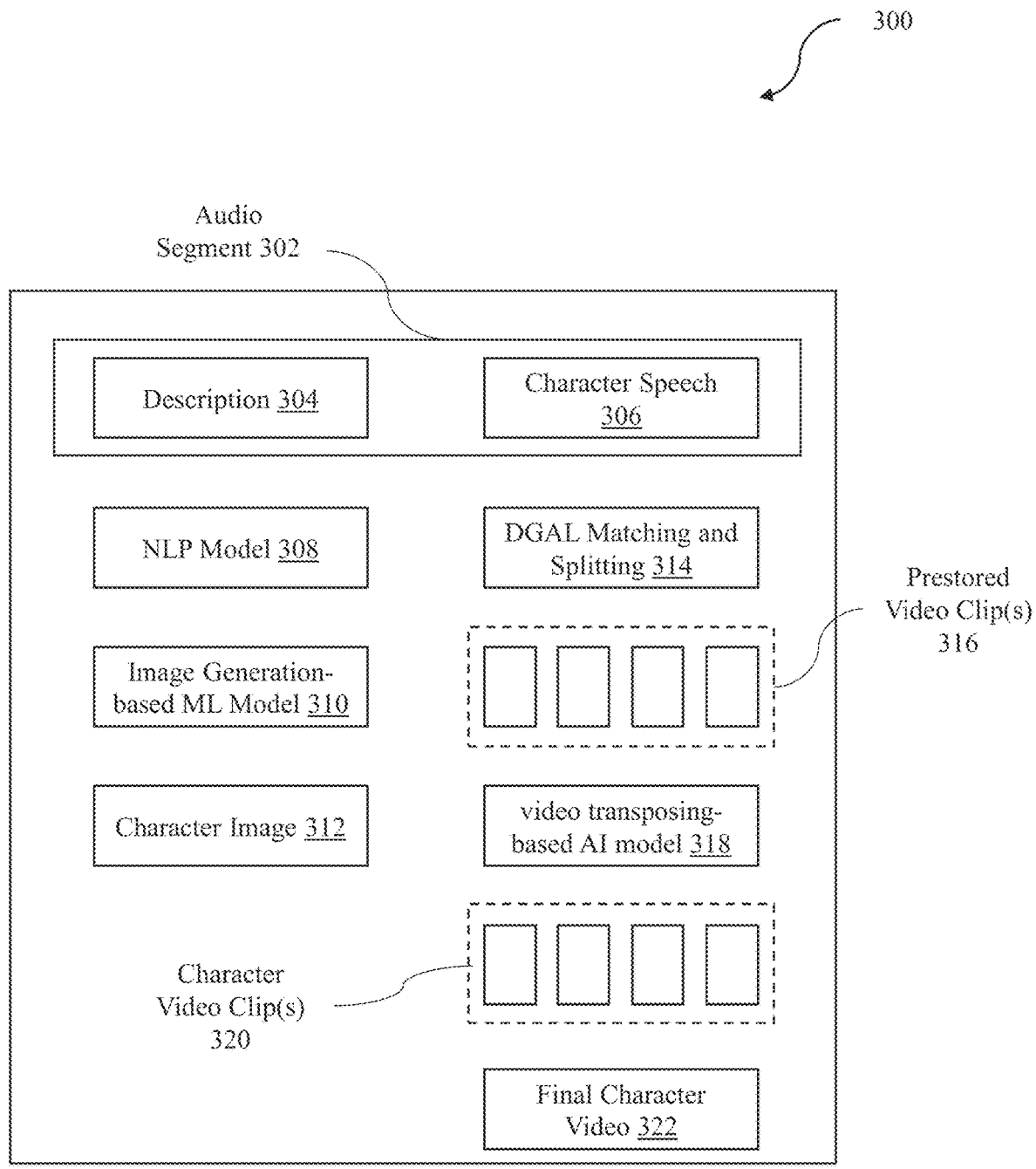
FIG. 3 is an exemplary block diagram depicting operation of the AI-based computing system to generate animated videos from the audio segment, in accordance with an embodiment of the present disclosure.

FIG. 3 is an exemplary block diagram depicting operation 300 of the AI-based computing system 104 to generate animated videos from the audio segment, in accordance with an embodiment of the present disclosure. In operation, the AI-based computing system 104 receives the audio segment 302 from the one or more electronic devices 102 associated with the user. The audio segment 302 includes a description 304 of the one or more characters and the scenery for the one or more characters, and the character speech 306 to be spoken by each of the one or more characters by using the one or more expressions. The AI-based computing system 104 converts the description 304 of the one or more characters and the scenery into a speech text by using an NLP model 308. Further, the image generation-based ML model 310 generates the character image 312 for each of the one or more characters based on the speech text. The image generation-based NIL model 310 also generate the scenery image for the scenery based on the speech text. Furthermore, the AI-based computing system 104 generates the final character image by transposing the generated scenery image onto the generated character image 312 by using the video transposing-based AI model.

Further, the AI-based computing system 104 extracts the one or more character sounds, the one or more character phrases or a combination thereof from the character speech 306 by using the one or more data extraction techniques upon generating the character image 312. Further, the AI-based computing system 104 compares the extracted one or more character sounds, the extracted one or more character phrases, or a combination thereof with the set of prestored video clips stored in the DGAL library by using the data matching-based deep learning model, at step 314. The AI-based computing system 104 also obtains the one or more prestored video clips 316 from DGAL library similar to the extracted one or more character sounds, the extracted one or more character phrases or a combination thereof based on result of comparison. The video transposing-based AI model 318 generates the one or more character video clips 320 by transposing each of the one or more prestored video clips 316 onto the generated character image 312. Furthermore, the AI-based computing system 104 generates the cohesive character video by performing one or more smoothing operations on the generated one or more character video clips 320 by using the video-stitching-based deep learning model. The AI-based computing system 104 generates the final character video 322 by transposing the second audio segment on the generated cohesive character video by using the video transposing-based AI model 318.

Figure 4A:
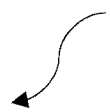
FIGS. 4A-4B are exemplary block diagrams depicting operation of the AI-based computing system to generate animated videos from the audio segment, in accordance with another embodiment of the present disclosure.
Figure 4A:
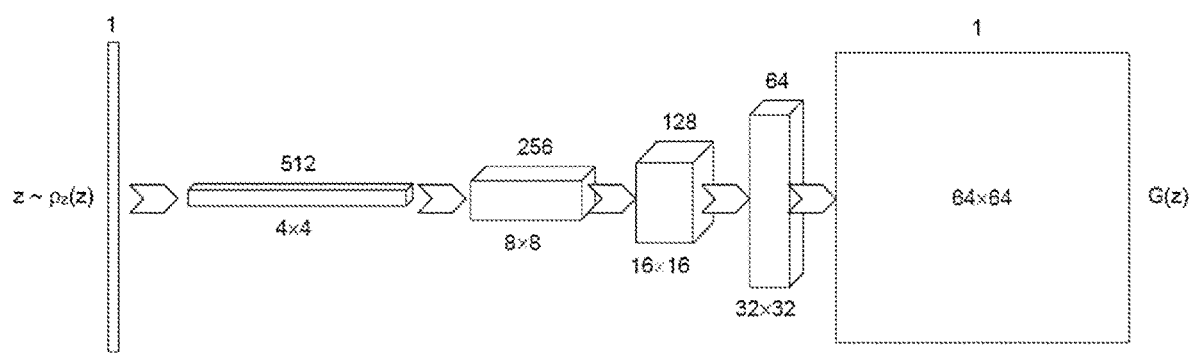
Figure 4B:
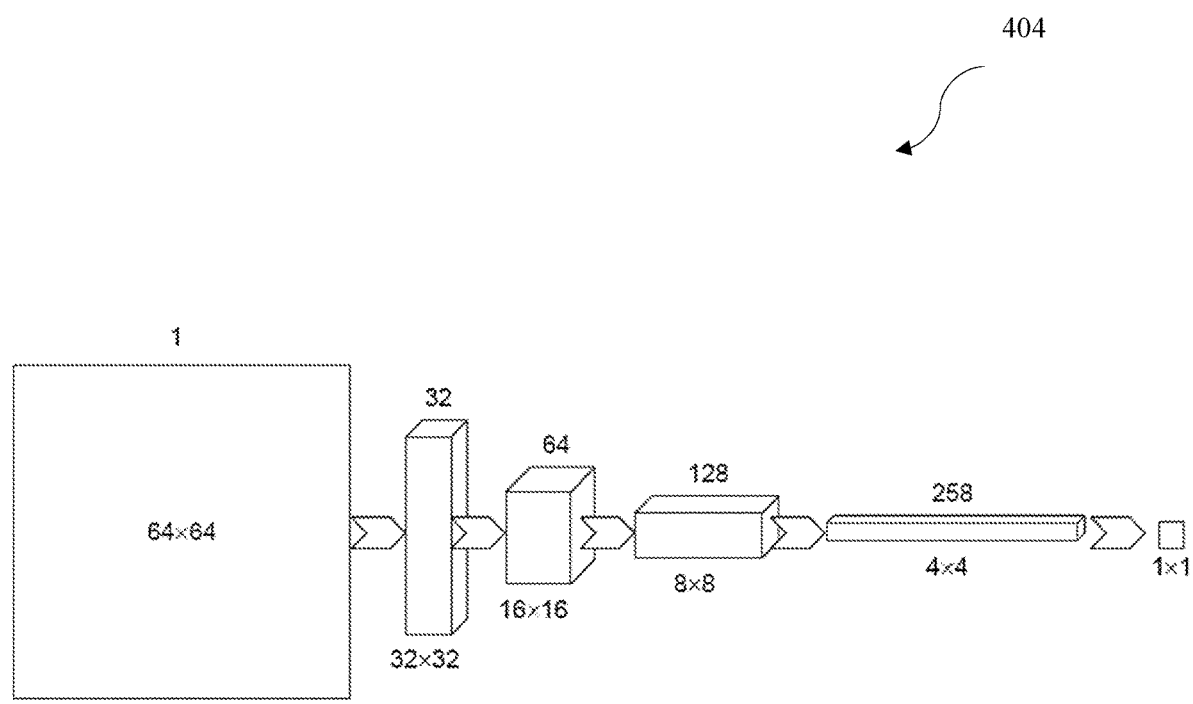

FIGS. 4A-4B are exemplary block diagrams depicting operation of the AI-based computing system to generate animated videos from the audio segment, in accordance with another embodiment of the present disclosure. In an embodiment of the present disclosure, FIG. 4A is a block diagram 402 depicting general network topology of a generator layout for generating the character image. Further, FIG. 4B is a block diagram 404 depicting general network topology of a discriminator layout for classifying the generated character image effectively. In an embodiment of the present disclosure, the general network topology depicted in block diagram 402 and the block diagram 404 includes convolutional layers ranging from 4 to 5. In an embodiment of the present disclosure, the character image is generated through a Deep Convolutional Generative Adversarial Network (DCGAN), which takes in the processed speech text and generates the character as output, as shown in the block diagram 402. To train the network, Adams optimizer and MSELoss are used in the style of Least Squares Generative Adversarial Networks (LSGANs) to accelerate training. In an embodiment of the present disclosure, the generator layout depicted in FIG. 4A uses ReLU activation layers with a final tanh( ) nonlinear layer. Further, the discriminator layout in FIG. 4B uses leaky ReLU activations and a final sigmoid activation to classify the generated image effectively. When the outline and features of the character are formed, the final step of the character generation process is to add necessary facial expressions/emotions, as specified in the audio descriptions (Ex. character described as "happy"). The DGAL library includes, in addition to samples of sounds/phrases, multiple actors performing various facial expressions corresponding to different emotions. Using a standard NLP-based search query, these samples can be accessed from the DGAL library per the audio instructions. Furthermore, a custom Graph Neural Network (GNN) is used, which has the facial features/landmarks as nodes on a graph (with nodes placed at the center & corners of the eyes, nose, edges of the mouth, etc.), to map the landmarks of the required facial expression sample in the DGAL library (extracting the emotion/expression) onto the generated character image.

Figure 5A:
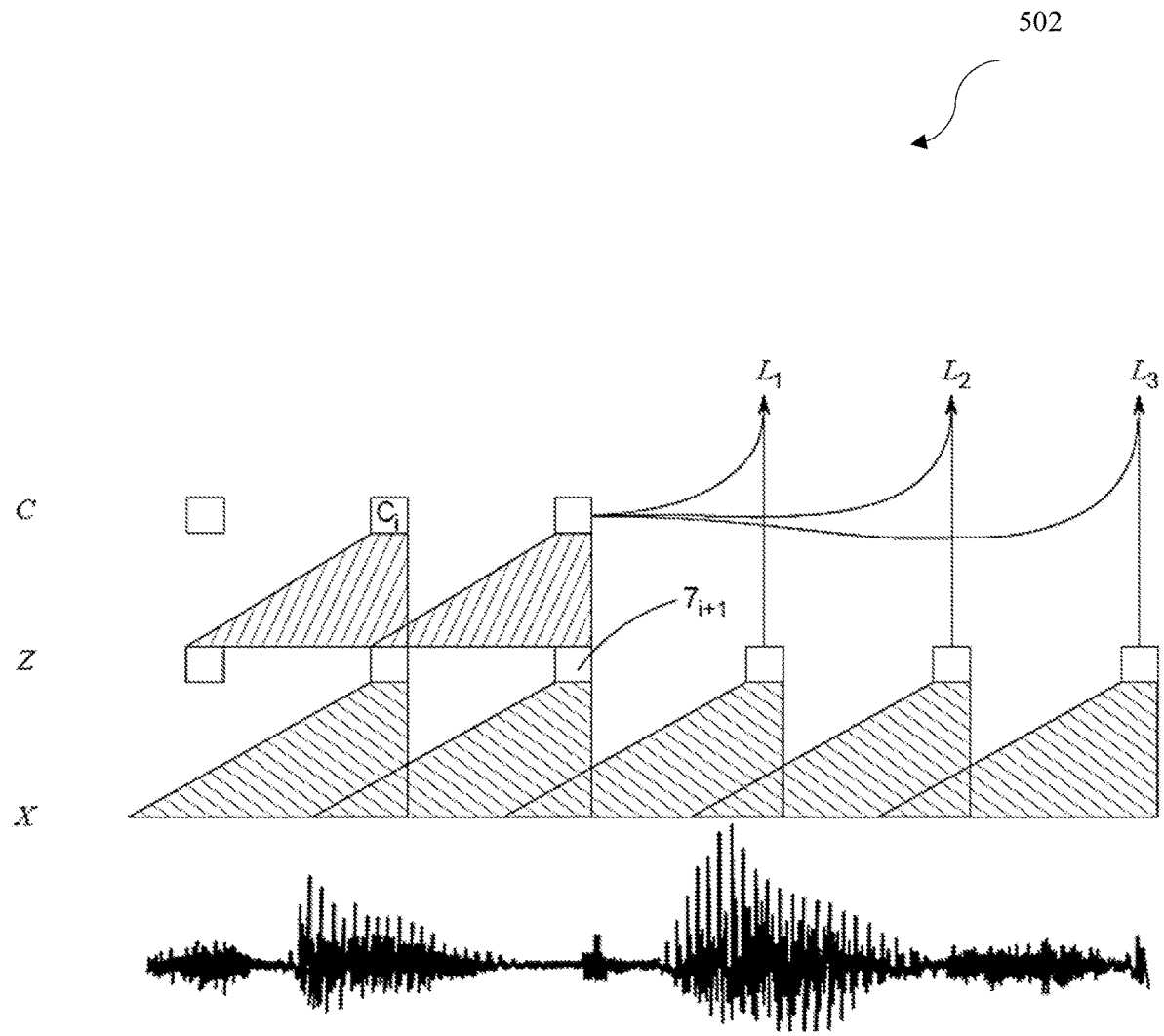
FIGS. 5A-5B are exemplary graphs depicting extraction of one or more character sounds and one or more character phrases from a second audio segment, in accordance with another embodiment of the present disclosure.
Figure 5B:
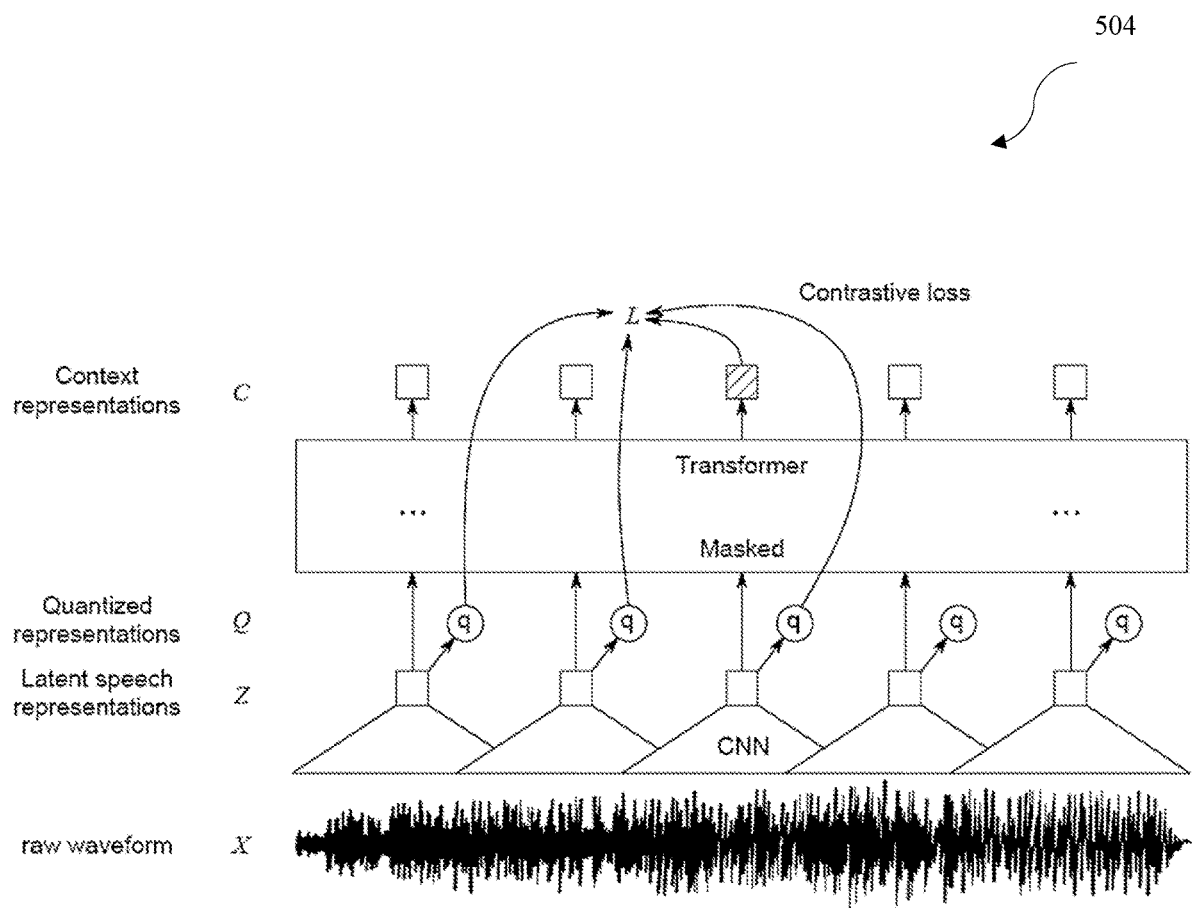

FIGS. 5A-5B are exemplary graphs depicting extraction of the one or more character sounds and the one or more character phrases from the second audio segment, in accordance with another embodiment of the present disclosure. In an embodiment of the present disclosure, NLP schema is used for extraction of the one or more character sounds and the one or more character phrases from the second audio segment. In an embodiment of the present disclosure, the context representations of the audio are run through a pre-trained Convolutional Neural Network (CNN) for quantized, and latent speech representations, as shown in graph 502 and graph 504. The latent speech representations are translated words in a sentence/paragraph. Further, a transformer model is used to generate specific phrases.

Figure 6:
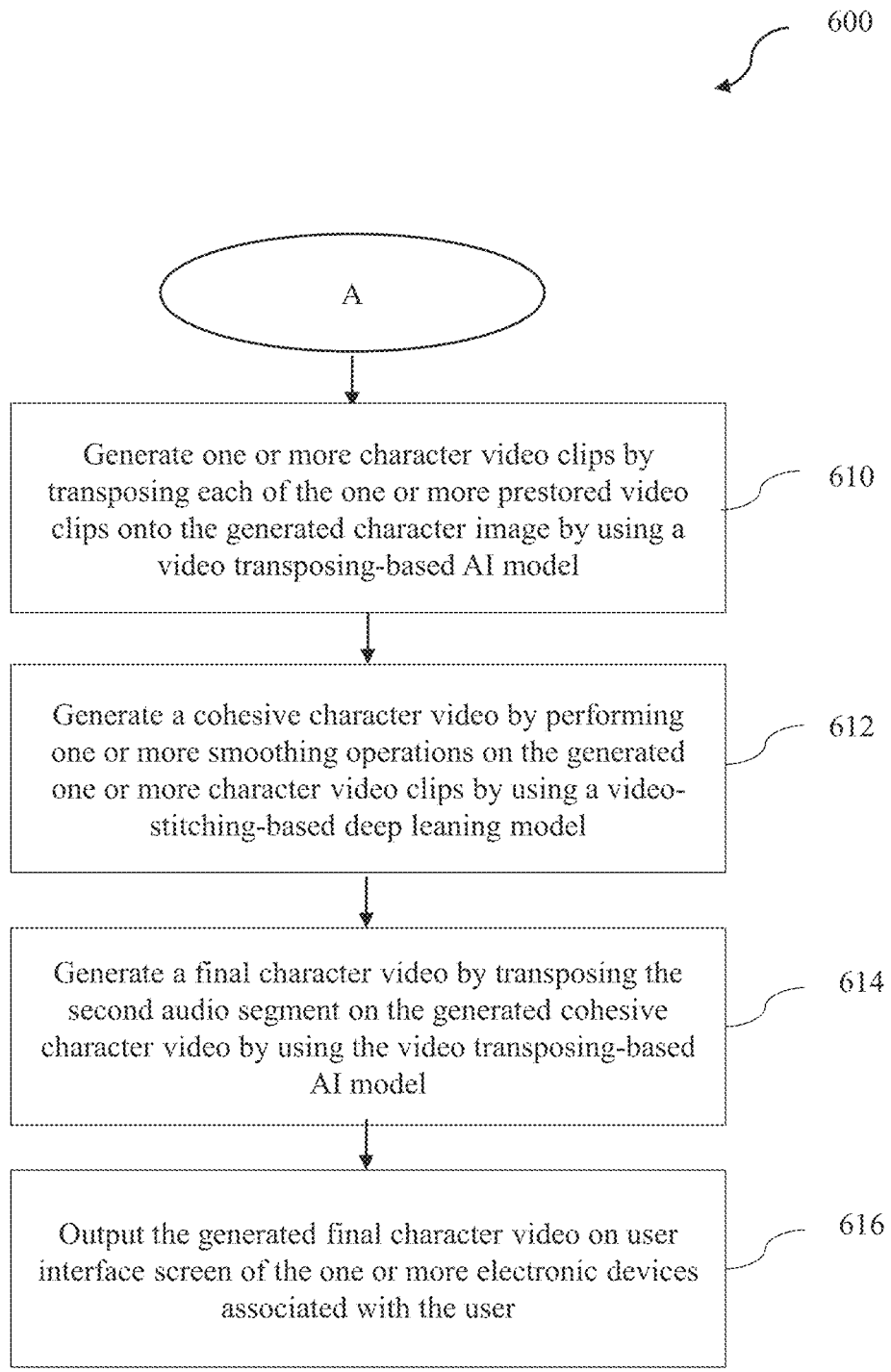
FIG. 6 is a process flow diagram illustrating an exemplary AI-based method for generating animated videos from the audio segment, in accordance with an embodiment of the present disclosure.

FIG. 6 is a process flow diagram illustrating an exemplary AI-based method for generating animated videos from an audio segment, in accordance with an embodiment of the present disclosure. At step 602, an audio segment is received from one or more electronic devices 102 associated with a user. In an embodiment of the present disclosure, the audio segment includes a first audio segment and a second audio segment separated by using a separation word. For example, the separation word used to separate the first audio segment and the second audio segment is 'break'. In an embodiment of the present disclosure, the first audio segment includes a description of one or more characters and a scenery for the one or more characters. In an embodiment of the present disclosure, the description of the one or more characters include eye, hair, skin color, one or more distinguishing facial features, type of the one or more characters, one or more major clothing items of the one or more characters, and the like. For example, one or more distinguishing facial features may include beard, mole, round cheeks, dimpled chin, and the like. In an exemplary embodiment of the present disclosure, the type of the one or more characters may be 2-Dimensional (D) character, 3-D character, human realistic character, animal character, plant, human character, photo-realistic character, anime character, and the like. In an exemplary embodiment of the present disclosure, the scenery may be mountains, dessert, beach, sunset, and the like. Further, the second audio segment includes a character speech to be spoken by each of the one or more characters by using one or more expressions. The character speech may include one or more character phrases and one or more character sounds. For example, the one or more character sounds may be laughing sound, crying sound, and the like. For example, the one or more character phrases may be 'Hello, my name is XYZ'. In an exemplary embodiment of the present disclosure, the one or more facial expressions include happiness, sadness, anger, surprise, disgust, fear, confusion, excitement, desire, contempt, and the like. For example, the one or more electronic devices 102 may include a laptop computer, desktop computer, tablet computer, smartphone, wearable device, smart watch, and the like.

At step 604, a character image is generated for each of the one or more characters based on the first audio segment by using the image generation-based ML model. In an embodiment of the present disclosure, the image generation-based ML model may be an advanced neural network model. In generating the character image for each of the one or more characters based on the first audio segment by using the image generation-based ML model, the AI-based method 600 includes converting the first audio segment into a speech text based on a type of language used in the first audio segment by using an NLP technique. Further, the AI-based method 600 includes generating the character image for each of the one or more characters based on the speech text by using the image generation-based ML model. The image generation-based Mt model may be an advanced image generation model, such as neural network model. In an embodiment of the present disclosure, the character image of each of the one or more characters are 2-D character, 3-D character, human realistic character, animal character, plant, human character, photo-realistic character, anime character, or a combination thereof.

At step 606, one or more character sounds, one or more character phrases or a combination thereof are extracted from the second audio segment by using one or more data extraction techniques upon generating the character image.

At step 608, one or more prestored video clips are generated from an external database 108 based on the extracted one or more character sounds, the extracted one or more character phrases or a combination thereof by using a data matching-based deep learning model. In an embodiment of the present disclosure, the external database 108 corresponds to a Differentiable Geometry Algorithm Library (DGAL). Further, the one or more prestored video clips correspond to video clips of one or more actors speaking the extracted one or more character sounds, the extracted one or more character phrases or a combination thereof along with the one or more facial expressions. In obtaining the one or more prestored video clips from the external database 108 based on the extracted one or more character sounds, the extracted one or more character phrases or a combination thereof by using the data matching-based deep learning model, the AI-based method 600 includes comparing the extracted one or more character sounds, the extracted one or more character phrases or a combination thereof with the set of prestored video clips stored in the external database 108 by using the data matching-based deep learning model. In an embodiment of the present disclosure, the set of prestored video clips correspond to video clips of the one or more actors speaking the set of character sounds and the set of character phrases along with the set of facial expressions. Further, the AI-based method 600 includes obtaining the one or more prestored video clips from the external database 108 similar to the extracted one or more character sounds, the extracted one or more character phrases or a combination thereof based on result of comparison.

At step 610, one or more character video clips are generated by transposing each of the one or more prestored video clips onto the generated character image by using the video transposing-based AI model. In an embodiment of the present disclosure, the video transposing-based AI model may be an advanced neural network model. In an embodiment of the present disclosure, the audio segment is transposed onto the generated cohesive character video using the public utility to synchronize and merge the audio with the generated output. The one or more character video clips are video clips of the one or more characters making the one or more expressions and one or more movements corresponding to each of the extracted one or more character sounds, the extracted one or more character phrases or a combination thereof.

At step 612, a cohesive character video is generated by performing one or more smoothing operations on the generated one or more character video clips by using a video-stitching-based deep learning model. In generating the cohesive character video by performing the one or more smoothing operations on the generated one or more character video clips by, using the video-stitching-based deep learning model, the AI-based method 600 includes generating a cohesive video by merging the generated one or more character video clips by using the video-stitching-based deep learning model. The AI-based method 600 includes removing one or more sudden shifts from the generated cohesive video by performing the one or more smoothing operations. Furthermore, the AI-based method 600 includes removing one or more breaks from the generated cohesive video by performing the one or more smoothing operations upon removing the one or more sudden shifts.

At step 614, a final character video is generated by transposing the second audio segment on the generated cohesive character video by using the video transposing-based AI model. In an embodiment of the present disclosure, the final character video is a video of the one or more characters speaking the character speech with the one or more expressions.

Further, the AI-based method 600 includes generating a scenery image for the scenery, based on the speech text by using the image generation-based ML model. Further, the AI-based method 600 includes generating a final character image by transposing the generated scenery image onto the generated character image by using the video transposing-based AI model. In an embodiment of the present disclosure, each of the one or more prestored video clips are transposed onto the generated final character image by using the video transposing-based AI model to generate the one or more character video clips. To generate the scenery image, a custom-trained Contrastive Language-Image Pretraining (CLIP)-Diffusion Model and Neural Style Transfer is used to achieve a desired artistic effect. The diffusion model works by taking an input of a training image and adding Gaussian noise till the point where the new image is independent of the original image. The model is trained by reversing this process (denoising), thus learning to generate images similar to the original image, guided by text prompts—the processed descriptions of the scenery taken from the audio segment. Further, the scenery image is transposed onto the generated character image. The scenery image corresponds to pre-existing styles (samples), which specify color and artistic style, using open-source neural style transfer techniques. In an embodiment of the present disclosure, the completed character video (not having a background) is transposed onto the scenery image by using a standard image mapping algorithm via the public utility.

At step 616, the generated final character video is outputted on user interface screen of the one or more electronic devices 102 associated with the user.

In an embodiment of the present disclosure, the AI-based method 600 includes receiving one or more audio inputs to update the character, the scenery, the speech, or a combination thereof in the final character video. Further, the AI-based method 600 determining a type of the received one or more audio inputs by using the NLP technique. In an embodiment of the present disclosure, the type of the received one or more audio inputs include the character, the scenery, the speech, or a combination thereof. Further, the AI-based method 600 updating the final character video based on the determined type of the received one or more audio inputs by using AI and Mt techniques.

The AI-based method 600 may be implemented in any suitable hardware, software, firmware, or combination thereof.

Thus, various embodiments of the present AI-based computing system 104 provide a solution to generate animated videos from the audio segment. The AI-based computing system 104 uses advanced neural network models to transform the audio segment into the photo-realistic video clip of the one or more characters speaking certain designated words. In an embodiment of the present disclosure, the AI-based computing system 104 allows creation of animated videos efficiently and in real-time. The AI-based computing system 104 may be used in film production. Furthermore, the AI-based computing system 104 may help in crime scenes as, currently police have to wait for days or weeks to get sketches based on eye-witness testimony. However, the AI-based computing system 104 may generate sketches in a matter of minutes, and the generated sketch can be changed based on the witness's feedback. The AI-based computing system 104 can also be used in medical therapy where patients can efficiently and accurately recreate their dreams for a therapist's review. In an embodiment of the present disclosure, the AI-based computing system 104 is significantly more efficient than prior solutions as it can create photo-realistic animated characters and their facial movements in a matter of minutes, where traditional methods take weeks or even months to create the photo-realistic animated characters.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. An Artificial Intelligence (AI)-based computing system for generating animated videos from an audio segment, the AI-based computing system comprising:
   one or more hardware processors; and
   a memory coupled to the one or more hardware processors, wherein the memory comprises a plurality of modules in the form of programmable instructions executable by the one or more hardware processors, and wherein the plurality of modules comprises:
      a data receiver module configured to receive an audio segment from one or more electronic devices associated with a user, wherein the audio segment comprises a first audio segment and a second audio segment separated by using a separation word, wherein the first audio segment comprises a description of one or more characters and a scenery for the one or more characters, and wherein the second audio segment comprises a character speech to be spoken by each of the one or more characters by using one or more expressions;
      a character generation module configured to generate a character image for each of the one or more characters based on the first audio segment by using an image generation-based Machine Learning (ML) model;
      a data extraction module configured to extract at least one of: one or more character sounds and one or more character phrases from the second audio segment by using one or more data extraction techniques upon generating the character image;
      a data obtaining module configured to obtain one or more prestored video clips from an external database based on at least one of: the extracted one or more character sounds and the extracted one or more character phrases by using a data matching-based deep learning model, wherein the one or more prestored video clips correspond to video clips of one or more actors speaking the at least one of: the extracted one or more character sounds and the extracted one or more character phrases along with the one or more facial expressions;

a video generation module configured to:
   generate one or more character video clips by transposing each of the one or more prestored video clips onto the generated character image by using a video transposing-based AI model, wherein the one or more character video clips are video clips of the one or more characters making the one or more expressions and one or more movements corresponding to each of the at least one of: the extracted one or more character sounds and the extracted one or more character phrases;
   generate a cohesive character video by performing one or more smoothing operations on the generated one or more character video clips by using a video-stitching-based deep learning model; and
   generate a final character video by transposing the second audio segment on the generated cohesive character video by using the video transposing-based AI model, wherein the final character video is a video of the one or more characters speaking the character speech with the one or more expressions; and
a data output module configured to output the generated final character video on user interface screen of the one or more electronic devices associated with the user.

2. The AI-based computing system of claim 1, wherein the description of the one or more characters comprises eye, hair, skin color, one or more distinguishing facial features, type of the one or more characters and one or more major clothing items of the one or more characters.

3. The AI-based computing system of claim 1, wherein the one or more facial expressions comprise happiness, sadness, anger, surprise, disgust, fear, confusion, excitement, desire, and contempt.

4. The AI-based computing system of claim 1, wherein in generating the character image for each of the one or more characters based on the first audio segment by using the image generation-based ML model, the character generation module is configured to:
   convert the first audio segment into a speech text based on a type of language used in the first audio segment by using a Natural Language Processing (NLP) technique; and
   generate the character image for each of the one or more characters based on the speech text by using the image generation-based ML model.

5. The AI-based computing system of claim 1, wherein in obtaining the one or more prestored video clips from the external database based on at least one of: the extracted one or more character sounds and the extracted one or more character phrases by using the data matching-based deep learning model, the data obtaining module is configured to:
   compare at least one of: the extracted one or more character sounds and the extracted one or more character phrases with a set of prestored video clips stored in the external database by using the data matching-based deep learning model, wherein the set of prestored video clips correspond to video clips of the one or more actors speaking a set of character sounds and a set of character phrases along with a set of facial expressions; and
   obtain the one or more prestored video clips from the external database similar to at least one of: the extracted one or more character sounds and the extracted one or more character phrases based on result of comparison.

6. The AI-based computing system of claim 1, wherein in generating the cohesive character video by performing the one or more smoothing operations on the generated one or more character video clips by using the video-stitching-based deep learning model, the video generation module is configured to:
   generate a cohesive video by merging the generated one or more character video clips by using the video-stitching-based deep learning model;
   remove one or more sudden shifts from the generated cohesive video by performing the one or more smoothing operations; and
   remove one or more breaks from the generated cohesive video by performing the one or more smoothing operations upon removing the one or more sudden shifts.

7. The AI-based computing system of claim 1, further comprising a scenery generation module configured to:
   generate a scenery image for the scenery based on a speech text by using the image generation-based ML model; and
   generate a final character image by transposing the generated scenery image onto the generated character image by using the video transposing-based AI model, wherein each of the one or more prestored video clips are transposed onto the generated final character image by using the video transposing-based AI model to generate the one or more character video clips.

8. The AI-based computing system of claim 1, wherein the one or more characters are at least one of: 2-Dimensional (D) character, 3-D character, human realistic character, animal character, plant, human character, photo-realistic character, and anime character.

9. The AI-based computing system of claim 1, further comprising a character updating module configured to:
   receive one or more audio inputs to update at least one of: the character, the scenery, and the speech in the final character video;
   determine a type of the received one or more audio inputs by using the NLP technique, wherein the type of the received one or more audio inputs comprise at least one of: the character, the scenery, and the speech; and
   update the final character video based on the determined type of the received one or more audio inputs by using AI and ML techniques.

10. An Artificial Intelligence (AI)-based method or generating animated videos from an audio segment, the AI-based method comprising:
   receiving, by one or more hardware processors, an audio segment from one or more electronic devices associated with a user, wherein the audio segment comprises a first audio segment and a second audio segment separated by using a separation word, wherein the first audio segment comprises a description of one or more characters and a scenery for the one or more characters, and wherein the second audio segment comprises a character speech to be spoken by each of the one or more characters by using one or more expressions;
   generating, by the one or more hardware processors, a character image for each of the one or more characters based on the first audio segment by using an image generation-based Machine Learning (ML) model;
   extracting, by the one or more hardware processors, at least one of: one or more character sounds and one or more character phrases from the second audio segment by using one or more data extraction techniques upon generating the character image;

obtaining, by the one or more hardware processors, one or more prestored video clips from an external database based on at least one of: the extracted one or more character sounds and the extracted one or more character phrases by using a data matching-based deep learning model, wherein the one or more prestored video clips correspond to video clips of one or more actors speaking the at least one of: the extracted one or more character sounds and the extracted one or more character phrases along with the one or more facial expressions;

generating, by one or more hardware processors; one or more character video clips by transposing each of the one or more prestored video clips onto the generated character image by using a video transposing-based AI model; wherein the one or more character video clips are video clips of the one or more characters making the one or more expressions and one or more movements corresponding to each of the at least one of: the extracted one or more character sounds and the extracted one or more character phrases;

generating, by one or more hardware processors, a cohesive character video by performing one or more smoothing operations on the generated one or more character video clips by using a video-stitching-based deep learning model;

generating, by one or more hardware processors, a final character video by transposing the second audio segment on the generated cohesive character video by using the video transposing-based AI model, wherein the final character video is a video of the one or more characters speaking the character speech with the one or more expressions; and outputting, by the one or more hardware processors, the generated final character video on user interface screen of the one or more electronic devices associated with the user.

11. The AI-based method of claim 10, wherein the description of the one or more characters comprises eye, hair, skin color, one or more distinguishing facial features, type of the one or more characters and one or more major clothing items of the one or more characters.

12. The AI-based method of claim 10, wherein the one or more facial expressions comprise happiness, sadness, anger, surprise, disgust, fear, confusion, excitement, desire, and contempt.

13. The AI-based method of claim 10, wherein in generating the character image for each of the one or more characters based on the first audio segment by using the image generation-based ML model, the AI-based method includes:

converting the first audio segment into a speech text based on a type of language used in the first audio segment by using a Natural Language Processing (NLP) technique; and generating the character image for each of the one or more characters based on the speech text by using the image generation-based ML model.

14. The AI-based method of claim 10, wherein in obtaining the one or more prestored video clips from the external database based on at least one of: the extracted one or more character sounds and the extracted one or more character phrases by using the data matching-based deep learning model, the AI-based method includes:

comparing at least one of: the extracted one or more character sounds and the extracted one or more character phrases with a set of prestored video clips stored in the external database by using the data matching-based deep learning model, wherein the set of prestored video clips correspond to video clips of the one or more actors speaking a set of character sounds and a set of character phrases along with a set of facial expressions; and obtaining the one or more prestored video clips from the external database similar to at least one of: the extracted one or more character sounds and the extracted one or more character phrases based on result of comparison.

15. The AI-based method of claim 10, wherein in generating the cohesive character video by performing the one or more smoothing operations on the generated one or more character video clips by using the video-stitching-based deep learning model, the AI-based method includes:

generating a cohesive video by merging the generated one or more character video clips by using the video-stitching-based deep learning model;

removing one or more sudden shifts from the generated cohesive video by performing the one or more smoothing operations; and removing one or more breaks from the generated cohesive video by performing the one or more smoothing operations upon removing the one or more sudden shifts.

16. The AI-based method of claim 10, further comprising:

generating a scenery image for the scenery based on a speech text by using the image generation-based ML model; and generating a final character image by transposing the generated scenery image onto the generated character image by using the video transposing-based AI model, wherein each of the one or more prestored video clips are transposed onto the generated final character image by using the video transposing-based AI model to generate the one or more character video clips.

17. The AI-based method of claim 10, wherein the one or more characters in the generated final character video are at least one of: 2-Dimensional (D) character, 3-D character, human realistic character, animal character, plant, human character, photo-realistic character, and anime character.

18. The AI-based method of claim 10, further comprising:

receiving one or more audio inputs to update at least one of: the character, the scenery, and the speech in the final character video;

determining a type of the received one or more audio inputs by using the NLP technique, wherein the type of the received one or more audio inputs comprise at least one of: the character, the scenery, and the speech; and updating the final character video based on the determined type of the received one or more audio inputs by using AI and ML techniques.

19. A non-transitory computer-readable storage medium having instructions stored therein that, when executed by a hardware processor, cause the processor to perform method steps comprising:

receiving an audio segment from one or more electronic devices associated with a user, wherein the audio segment comprises a first audio segment and a second audio segment separated by using a separation word, wherein the first audio segment comprises a description of one or more characters and a scenery for the one or more characters, and wherein the second audio segment comprises a character speech to be spoken by each of the one or more characters by using one or more expressions;

generating a character image for each of the one or more characters based on the first audio segment by using an image generation-based Machine Learning (ML) model;

extracting at least one of: one or more character sounds and one or more character phrases from the second audio segment by using one or more data extraction techniques upon generating the character image;

obtaining one or more prestored video clips from an external database based on at least one of: the extracted one or more character sounds and the extracted one or more character phrases by using a data matching-based deep learning model, wherein the one or more prestored video clips correspond to video clips of one or more actors speaking the at least one of: the extracted one or more character sounds and the extracted one or more character phrases along with the one or more facial expressions;

generating one or more character video clips by transposing each of the one or more prestored video clips onto the generated character image by using a video transposing-based AI model, wherein the one or more character video clips are video clips of the one or more characters making the one or more expressions and one or more movements corresponding to each of the at least one of: the extracted one or more character sounds and the extracted one or more character phrases;

generating a cohesive character video by performing one or more smoothing operations on the generated one or more character video clips by using a video-stitching-based deep learning model;

generating a final character video by transposing the second audio segment on the generated cohesive character video by using the video transposing-based AI model, wherein the final character video is a video of the one or more characters speaking the character speech with the one or more expressions; and outputting the generated final character video on user interface screen of the one or more electronic devices associated with the user.

20. The non-transitory computer-readable storage medium of claim 19, wherein the description of the one or more characters comprises eye, hair, skin color, one or more distinguishing facial features, type of the one or more characters and one or more major clothing items of the one or more characters.

\* \* \* \* \*